UNITED STATES PATENT OFFICE.

BERNHARD HEYMANN, OF ELBERFELD, AND RUDOLF REYHER, OF FRANKFORT-ON-THE-MAIN, GERMANY, ASSIGNORS TO THE FARBENFABRIKEN, VORMALS FR. BAYER & CO., OF ELBERFELD, GERMANY.

RED AZIN DYE.

SPECIFICATION forming part of Letters Patent No. 592,608, dated October 26, 1897.

Application filed August 17, 1896. Serial No. 602,998. (No specimens.) Patented in England February 9, 1895, No. 2,900; in France March 8, 1895, No. 245,641, and in Italy March 9, 1895, XXIX, 38,401, LXXV, 236.

*To all whom it may concern:*

Be it known that we, BERNHARD HEYMANN, chemist and doctor of philosophy, a subject of the Emperor of Germany, residing at Elberfeld, and RUDOLF REYHER, chemist and doctor of philosophy, a subject of the Emperor of Russia, residing at Frankfort-on-the-Main, Prussia, Germany, (assignors to the FARBENFABRIKEN, VORMALS FR. BAYER & CO., of Elberfeld, Prussia, Germany,) have invented a new and useful Improvement in the Manufacture of Red Azin Dye, (for which the aforesaid FARBENFABRIKEN, VORMALS FR. BAYER & CO., have already obtained Letters Patent in England, No. 2,900, dated February 9, 1895; in France, No. 245,641, dated March 8, 1895, and in Italy, Vol. XXIX, No. 38,401, Vol. LXXV, No. 236, dated March 9, 1895;) and we do hereby declare the following to be an exact and clear description of our invention.

Our invention relates to the production of red azin dye, obtainable from oxidizing one molecular proportion of the hydrochlorate of paraämidomonoalkyl-orthotoluidin with one molecular proportion of monoalkyl-orthotoluidin and finally combining the so-formed indamin product with one molecular proportion of a primary amin, as anilin, and so on. The dye thus produced yields brilliant shades on cotton, as well as on cotton mordanted with tannin or the like, fast to the action of alkali and light.

In carrying out our invention practically we proceed, for example, in the following manner: Fifteen parts, by weight, of paraamidomonoethyl-orthotoluidin, in the form of its hydrochlorate, are dissolved together with 17.2 parts, by weight, of the hydrochlorate of monoethyl-orthotoluidin in one thousand parts, by weight, of water. At ordinary temperature twenty parts, by weight, of potassium bichromate dissolved in four hundred parts, by weight, of water are allowed to flow rapidly to the aforesaid watery solution. In this manner the intermediate product—that is to say, the so-called "indamin"—is formed. After having added once more twenty parts, by weight, of potassium bichromate dissolved in four hundred parts, by weight, of water and a solution of thirteen parts, by weight, of anilin hydrochlorid dissolved in a small quantity of water to the indamin mixture, the whole is slowly heated and finally boiled for about an hour. After this time the formation of the azin dye is complete. The mixture is cooled down and the residue is filtered off. The filtered precipitate, containing the azin dye, together with some by-products, is exhausted with boiling water, and on mixing the joint hot extracts of the dyestuff with common salt the pure dyestuff separates in form of brown small crystals, which are filtered off, pressed, and dried.

The dye thus obtained has the following properties: The pulverized coloring-matter forms a brown powder which dissolves rather slowly in cold water, but readily in hot water, with a brilliant red color. It is soluble in alcohol with a red color showing an intensive yellow fluorescence, almost insoluble in strong ammonia liquor. By concentrated sulfuric acid (66° Baumé) it is dissolved with a green color, which turns into blue on the addition of a small quantity of ice-water to the sulfuric-acid solution. If, however, a large quantity of water is added to the sulfuric-acid solution, the blue solution turns gradually from violet, violet red, to red. If a concentrated solution of the dyestuff in water is mixed with any diluted mineral acid, the dyestuff is precipitated in the form of thin brown crystals. If the solution of the dyestuff is mixed with soda-lye, reddish-brown flakes separate from the watery solution.

The dyestuff produces on cotton mordanted with tannin and likewise on unmordanted cotton brilliant red shades of such a clearness as are never produced by any analogous safranin dye known hitherto.

The dyestuff thus produced has probably the following formula:

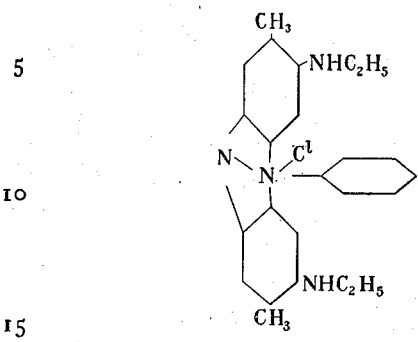

Analogous dyestuffs are obtained if in the foregoing example the paraämidomonoethyl-orthotoluidin and the monoethyl-orthotoluidin are replaced by the paraämidomonomethyl-orthotoluidin and monomethyl-orthotoluidin and if the anilin is replaced by any other primary amin. Otherwise analogous dyestuffs having the same properties as set forth can be produced if in the foregoing example paraämidomonoethyl-orthotoluidin is combined with monomethyl-orthotoluidin, or otherwise if paraämidomonomethyl-orthotoluidin is combined with monoethyl-orthotoluidin, and if finally the resulting indamin compound is oxidized together with anilin or any other primary amin.

Having now described our invention and in what manner the same is to be performed, what we claim as new, and desire to secure by Letters Patent, is—

1. The process for the production of azin dyes, which process consists in oxidizing first one molecular proportion of the hydrochlorate of paraämidomonoalkyl-orthotoluidin with one molecular proportion of monoalkyl-orthotoluidin and secondly oxidizing the resulting indamin compound with any primary amin of the aromatic series.

2. As a new article of manufacture the azin dyes obtainable from oxidizing paraämidomonoalkyl-orthotoluidin first with monoalkyl-orthotoluidin and then with anilin or another primary amin of the aromatic series having in case paraämidomonoethyl-orthotoluidin, monoethyl-orthotoluidin and anilin be used, probably the following formula:

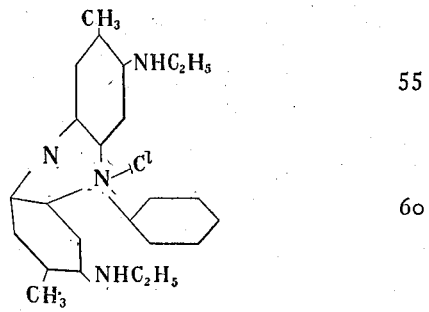

forming, when pulverized, a brown powder, easily soluble in hot water with a splendid red color, soluble in alcohol with the same color, yielding a strong yellow fluorescence, almost insoluble in strong ammonia liquor, soluble in concentrated sulfuric acid (66° Baumé) with a green color, which turns into blue on the addition of a small quantity of ice-water to the sulfuric-acid solution and finally from violet to red on the addition of a very large quantity of water, being precipitated from its strong watery solution as thin brown crystals on adding diluted mineral acids, producing on mordanted cotton as well as on unmordanted cotton very clear red shades of great fastness to the action of alkali and light.

In testimony whereof we have signed our names in the presence of two subscribing witnesses.

BERNHARD HEYMANN.
RUDOLF REYHER.

Witnesses to Bernhard Heymann:
  OTTO KÖNIG,
  EMIL HESS.

Witnesses to Rudolf Reyher:
  FRANK H. MASON,
  JEAN GRUND.